United States Patent [19]

Weber

[11] 4,355,300

[45] Oct. 19, 1982

[54] INDICIA RECOGNITION APPARATUS

[75] Inventor: Harold J. Weber, Sherborn, Mass.

[73] Assignee: Coulter Systems Corporation, Bedford, Mass.

[21] Appl. No.: 121,405

[22] Filed: Feb. 14, 1980

[51] Int. Cl.³ .............................................. G06K 7/08

[52] U.S. Cl. .............................. 340/146.3 C; 235/451

[58] Field of Search ...................... 340/146.3 C, 54 Z; 178/18; 235/451

[56] References Cited

U.S. PATENT DOCUMENTS

| | | | |
|---|---|---|---|
| 2,791,310 | 5/1957 | Jones | 340/146.3 Z |
| 2,955,277 | 10/1960 | Shelton | 340/146.3 C |
| 3,089,123 | 5/1963 | Hennis et al. | 340/146.3 C |
| 3,559,170 | 1/1971 | Barnes | 340/146.3 Z |
| 3,596,249 | 7/1971 | Tierney | 340/146.3 Z |
| 3,716,701 | 2/1973 | Cohen | 235/451 |
| 3,736,368 | 5/1973 | Vogelman et al. | 340/149 A |
| 3,922,529 | 11/1975 | Orloff | 235/451 |
| 3,935,431 | 1/1976 | Scheffel | 235/451 |
| 4,158,834 | 6/1979 | Nakanishi et al. | 340/146.3 MA |
| 4,159,471 | 6/1979 | Whitaker | 340/146.3 Z |

*Primary Examiner*—Leo H. Boudreau

*Attorney, Agent, or Firm*—Silverman, Cass & Singer, Ltd.

[57] ABSTRACT

Method and device for detecting the presence or the absence of conductive indicia carried by a supporting substrate which together comprise a security document, for the purpose of ascertaining the genuineness, value or other selected characteristic represented by said indicia. The indicia material is electrically conductive. The detecting device includes a housing and a sensing circuit including a source of high frequency a.c. alternating signals, first and second electrodes and the a.c. source coupled thereto.

A carrier for the document is arranged in proximity to said electrodes. The questioned document is placed in the vicinity of the electrodes whereby the presence of the conductive encoding indicia serves as a coupling mechanism between the electrodes for capacitively inducing a secondary a.c. signal from the first electrodes to the second which is different from the first mentioned a.c. signal, said secondary signal being of a selected measured magnitude representative of said presence and of encoding. The housing may be provided with a transparent cover so that the document remains visible during evaluation, and to assure good electrical contact over its area.

29 Claims, 13 Drawing Figures

INDICIA RECOGNITION APPARATUS

FIELD OF THE INVENTION

This invention relates generally to means for determining the genuineness and/or value, of documents of value (security documents) and particularly, the detection and evaluation of such documents as are provided with conductive encoding indicia intimately associated with the printed substrate defining same. In particular, the invention herein provides a portable sensing device in which the document may be placed and the evaluation made as to genuineness, etc. while the document is visible to the observer, the evaluation being made on the basis of measured capacitive induction occasioned by the presence of said indicia.

BACKGROUND OF THE INVENTION

Documents of value, sometimes referred to as security documents, such as currency, stock and bond certificates, and the like, require assessment of their genuineness and/or value recognition with certainty and rapidity. Equal importance is directed to providing means for such verification which itself is difficult to counterfeit. Detectable indicia can be applied in an encoding pattern upon the document, which indicia offer recognition of genuineness. Further, such encoding indicia permit value recognition for identification, sorting, evaluation and like purposes. Preferably, the indicia employed should be invisible to the naked eye, yet should be instantaneously apparent when detection and/or recognition is desired, preferably by one who is not skilled or sophisticated, employing easily operated, low-cost detecting and/or recognition equipment.

The indicia requirement per se may be met by applying a minute quantity of an electrically conductive medium, a metal for example, in a very thin coating uniformly in bands or other pattern over a portion of the document surface. In selecting the material comprising the indicia, and selecting the method of application, the choice should be restricted to ones which are economically and/or technically, difficult and expensive to effect so that duplication of such encodings are out of the economic reach of likely counterfeiters and the like. The encodings should be visually transparent, while retaining a clear differentiating characteristic, the presence or absence of which can be detected.

With available methods and means, detection and/or identification require sophisticated techniques and often complex sensing devices. Further, with wear, bends, creases occasioned, say with repeatedly circulated currency for example, the effective detectability of the genuineness and/or recognition of value by sensing of applied indicia is reduced markedly. It is very difficult to recognize discontinuous coatings by methods available to the art. Recognition by resistance or conductivity measurements normally requires indicia coating thicknesses that render the coatings visible, a factor that reduces their effectiveness.

In copending application Ser. No. 085,259 filed Oct. 16, 1979, owned by assignee hereof, there is described a security document which is encoded with a thin, transparent coating which is normally invisible and includes particles driven into the surface of the carrier substrate to a substantial depth. The selected coating is laid down in a limited area of the substrate surface in an encoding pattern which can be readily identified when detected. A second coating can be applied to the overall document so that all areas of the document have the same overall appearance whereby additionally to mask visible detection of the presence of such encoding indicia.

Wear, creasing, aging, discontinuities or other physical impairment of the document should not deleteriously affect the detection of the selected indicia and pattern thereof. The detecting device should be economical and preferably should be small enough to enable placement, say on a counter or the like, or upon a desk for point of sale usage, for example the device should be portable and of low cost. Additionally, it would be of considerable advantage if the operation of the detector device did not require withdrawing the subject document from visual observation during the determination of genuineness, etc.

In addition to detection and recognition, an additional function which advantageously could be effected at the same time as inspection involves the performance of a function in response to such detection and/or recognition. Accordingly, the detection or recognition device should be responsive to a particular signal to cause a secondary function such as a digital display, a comparison with a preprogrammed memory device, or produce a signal which can be directed to effect other secondary functional operations such as effecting accounting functions, and even trigger a memory device to ascertain correct record ownership of the inspected document.

SUMMARY OF THE INVENTION

An indicia sensing and/or recognition device for determining the genuineness and/or value of a security document carrying encoded indicia as a part thereof, said device basically operating upon the measurement of differences in a physical characteristic of the indicia relative to the substrate carrier which evidence the presence and character of the indicia.

The invention herein involves the detection of electrically conductive indicia by measuring a capacitively induced secondary a.c. signal arising because of the presence of such indicia, the secondary a.c. signal being different than the primary a.c. signal applied when the indicia is not present. The device according to the invention preferably is portable, and includes a housing, a pair of spaced first and second electrodes seated within the housing and a source of a.c. alternating current connected to apply an a.c. signal, preferably of high frequency, across said electrodes, an energy field being established in the vicinity thereof. The document to be inspected is placed in the housing in the vicinity of said electrodes, bridging same, or interrupting said energy field. The selected encoding indicia applied to the document capacitively induces a secondary a.c. signal by way of the indicia which signal different from any signal detected in the absence of the coating, the value or magnitude of which is measured and represents the presence or absence of such indicia and further, is related if so encoded to the value or other characteristic of the document enabling the recognition thereof.

DESCRIPTION OF PREFERRED EMBODIMENTS

Figure 1:
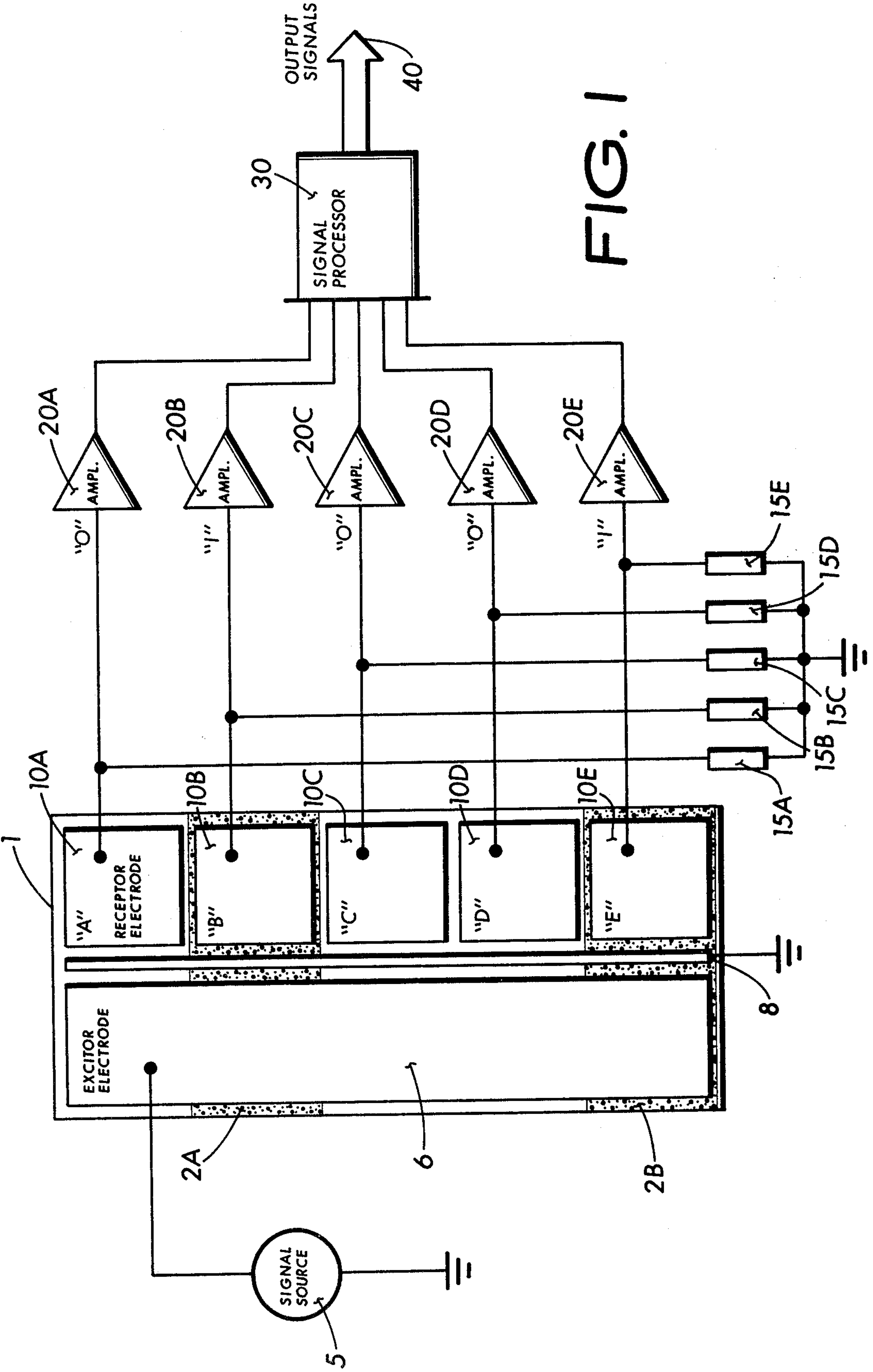
FIG. 1 is a schematic representation illustrating the detecting device according to the invention for security document genuineness and/or recognition.

Referring to FIG. 1, there is illustrated a security document 1 which is provided with a pair of indicia stripes 2A and 2B applied to an insulating substrate 3, such as paper. The indicia 2A, 2B is selected and applied to the document before or after printing, so as to make the document capable of supporting electrical conduction at least on the surface of the area bounded by the indicia, with the material of the indicia intimately associated with the substance of the document.

The material forming stripes 2A and 2B is at least nearly invisible to the naked eye and may comprise certain conductive metals or metal salts in extremely thin layers on the surface of the document substrate. In the examples described herein, the technique of deposition of the material selected to form the indicia enables at least part of the conductive medium to penetrate and effectively impregnate the substrate whereby the area or region of the indicia effectively is less insulative in such regions.

Average layer thicknesses on the order of 5 to 50 nanometers are supportive of indicia conductivities on the order of several kilohms to not more than several tens of kilohms, depending upon the composition employed.

A signal source 5 is coupled to an excitor electrode 6 and produces a high frequency alternating current signal, the frequency of which is between 1 and about 100 kilohertz. The exact frequency selected depends upon the production of the best overall effect while compensating for various parasitic coupling modes, particularly through stray capacitance.

A plurality of receptor electrodes, 10A to 10E in the form of planar plates, are disposed alongside, in a row and spaced from each other and also spaced laterally from excitor electrode 6. A guard electrode 8 is disposed intermediate the excitor electrode 6 and electrodes 10A–10E. The guard electrode 8 is coupled to ground as shown at 8′. An alternating current (a.c.) signal from a source 5 couples from excitor electrode 6 to each conductive indicia strip 2A, 2B by capacitive induction (electrostatic transfer of charge) and thereby serves to impress an a.c. signal on each indicia of a substantial magnitude, albeit less than on the excitor electrode itself. The indicia bound a.c. signal re-emanates, as a parasitic electrostatic signal, throughout the bounds of the indicia proper. The result is that the parasitic signal field will couple to those of the receptor electrode attendant to the areas distinguished by the indicia extension to the vicinity of the receptor electrode or electrodes.

For example, in FIG. 1, the field extension of indicia 2A will reach receptor electrode 10B while the field extension of indicia 2B will reach receptor electrode 10E. Accordingly, a secondary a.c. signal will be induced on each of the receptor electrodes 10B and 10E. The value of such signal will be significantly smaller than that induced by the signal source to the excitor electrode due to the two coupling mode losses. Such losses first are from the excitor electrode to the indicia and secondly, from the indicia to the receptor electrode, respectively.

Signals appearing on the several receptor electrodes, and most particularly on receptor electrodes 10B and 10E are independently amplified by the respective coupled amplifiers 20A through 20E. Preferably, the amplifiers are restricted to a narrow frequency band centered about the effective signal source frequency. Such frequency bandwidth selectivity in the amplifiers results in a better system signal-to-noise factor, especially insofar as 60 hertz (or 50 hertz) hum rejection is concerned.

The signal voltage appearing at the individual amplifier input effectively is produced by the a.c. current flow path through the respective interposed load resistors 15A through 15E. Typical resistor values on the order of 10–100 kilohms have been found practical. Through the judicious selection of the load resistor value relative to electrode sizes and spacings, the performance at any given signal source frequency may be optimized for the signal coupled directly between the exciter and receptor electrodes by way of indicia coupling mechanism as compared to the ancillary signal produced by parasitic coupling between the electrodes by other than indicia coupling. The result is an improved dynamic range for signal over noise.

Alternatively, the signal source may provide a signal including any generally recurrent voltage level change wherein the predominant or essential time rate of change $t_r$ is generally fast enough to satisfy $$(1/t_r) \geqq 500$$

This is to say that the essential frequency component of such a nonlinear signal shall have an equivalent rate of at least about 500 Hertz.

A representation excitor signal is on the order of at least several volts, peak-to-peak, and therefor the usable signal transferred through the coupling mechanism will be somewhat less due to the losses incurred via the coupling mechanism. This may be represented approximately by the relationships $$S_2 = S_1 \times \mathrm{eff}_T$$

where $eff_T = eff_1 + eff_2$ = total efficiency;

$S_1$ = the signal to the excitor electrode $S_2$ = the signal to the receptor electrode $eff_1$ = coupling efficiency exciter electrode to indicia $eff_2$ = coupling efficiency indicia to receptor electrode $eff_1 = (V_I/V_E)\cdot 100$ (percent)

$eff_2 = (V_R/V_I)\cdot 100$ (percent)

where $V_E$ = Electrostatic Voltage on Excitor Electrode $V_R$ = Electrostatic Voltage on Receptor Electrode $V_I$ = Electrostatic Voltage on Indicia (Coupling Mechanism)

The particular indicia combination illustrated in FIG. 1, results in a relative signal condition of:

| A | B | C | D | E |
|---|---|---|---|---|
| 0 | 1 | 0 | 0 | 1 |

A signal processor 30 is provided and these signal weights are coupled thereto. The signal processor 30 serves to combine the several input signals by way of combinational logic circuits to yield significant output signals 40 relative to the indicia meaning.

Figure 2:
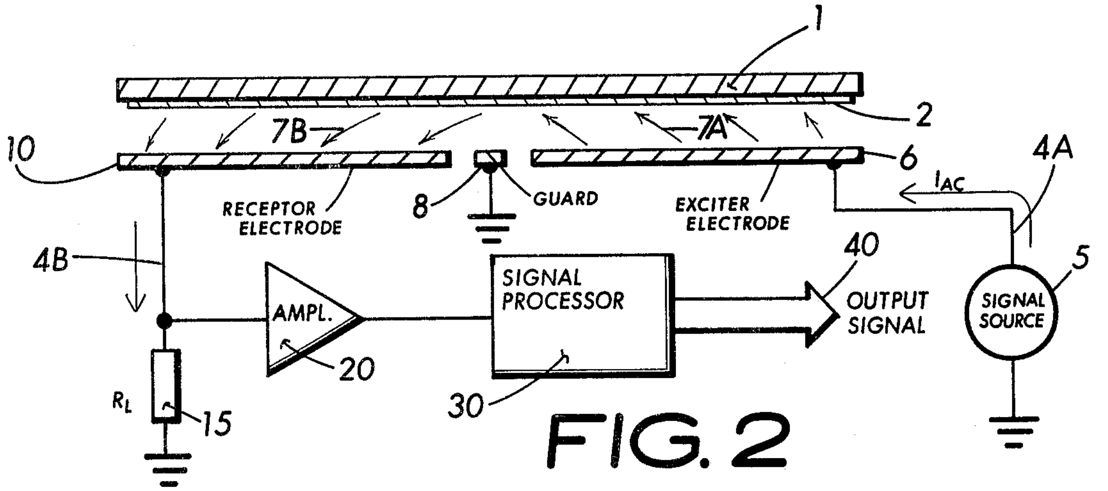
FIG. 2 is a diagrammatic representation illustrating the detecting device of FIG. 1.

Referring to FIG. 2, wherein a sensor station is illustrated, a signal source 5 is coupled via line 4B to excitor electrode 6 to apply a high frequency signal (usually on the order of 5–100 kilohertz) thereto. Thus, an electric field is established, including field lines 7A which extend to the conductive indicia 2 on insulative substrate 1. Through the principles of capacitive induction in an alternating current field, charge transfer will take place between the excitor electrode 6 and the indicia 2A with the result that a secondary electric field 7B will be established in the indicia. The secondary field will extend towards the receptor electrode 10, with the result that the receptor electrode will receive an alternating charge the frequency of which replicates the signal source rate. This charge is then directed to ground through load resistor 15.

Current flow $I_{AC}$ is represented by the arrow 4A from the source 5 and arrow 4B to the load resistor 15. Accordingly, the $I_{AC}R_L$ drop through resistor 15 will develop an a.c. signal value at the input of amplifier 20 which is amplified and coupled to the signal processor 30 and subsequently produces an output signal 40.

If the indicia is absent, as with a counterfeit document for example, no signal current $I_{AC}$ will flow and the signal processor 30 will produce no output 40.

The guard electrode 8 serves to block any flow of a.c. current between the edges of the electrodes 6 and 10 brought about by parasitic capacitive coupling.

Figure 3:
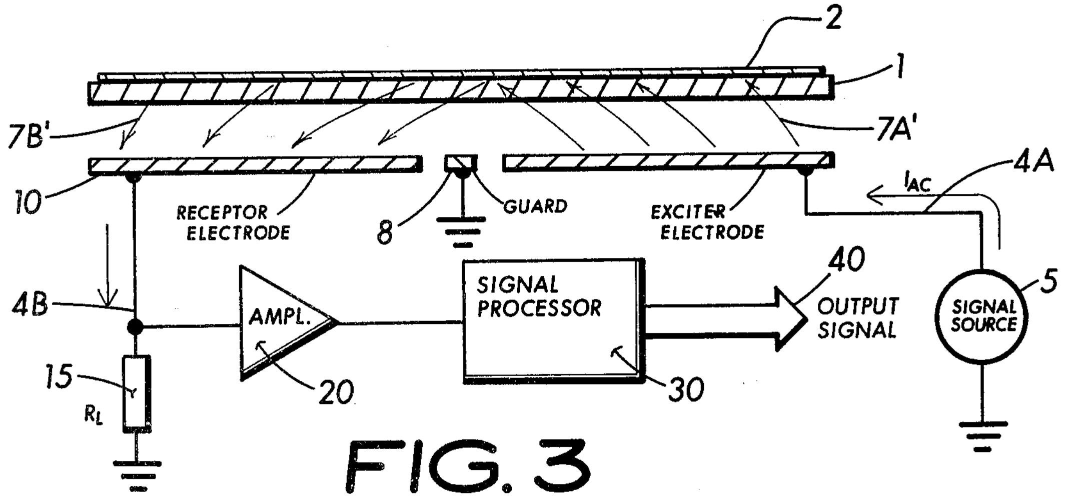
FIG. 3 is a diagrammatic representation illustrating a modified detecting device according to the invention.

A modified embodiment of the invention is illustrated diagrammatically in FIG. 3, wherein the obverse, indicia bearing surface 2 of the document substrate 1 is contrapositioned relative to the excitor electrode 6 and the receptor electrode 10. The resulting effect is that the electric field lines 7A' emanating from the excitor electrode 6 will extend through the substrate and subsequently charge the indicia. How this is possible is obvious if one remebers that the "space" shown between the excitor electrode and the document is a dielectric in the form of a gas compound, such as air, or possibly a vacuum, and has a dielectric constant on the order of one. The substrate acts as a second dielectric element, and generally may reasonably be expected to have a dielectric constant "K" on the order of about 3.2. The realized effect is that the substrate appears, to the electric field, as though it were a dielectric with an apparent thickness t which is but $t = T/K$ relative to the actual thickness T.

Therefore, the realized effect of the dielectric substrate thickness T on the overall electric field line extension is, for practical purpose, negligible. The electric field lines 7A' serve to charge the conductive indicia 2, which itself emanates a secondary field as a reslt throughout its extension on the substrate 1. Some of the field lines 7B' reach through the dielectric substrate and the intervening "air gap" (which is usually on the order of but a few thousandths of an inch) dielectric effect to reach the receptor electrode 10 and induce a charge thereon at an alternating current signal with replicate recurrence rate as that of the signal source 5.

The result is an a.c. current flow $I_{AC}$ from the source 4A, through the indicia bearing document, and returning 4B through the load resistor 15. The signal $E_{AC}$ developed across the load resistor, expressed as $$E_{AC} = I_{AC}R_L$$

coupled to the input of an amplifier 20 for lever enhancement, whereupon it is coupled to the signal processor 30 to provide a useful output signal 40.

Figure 4:
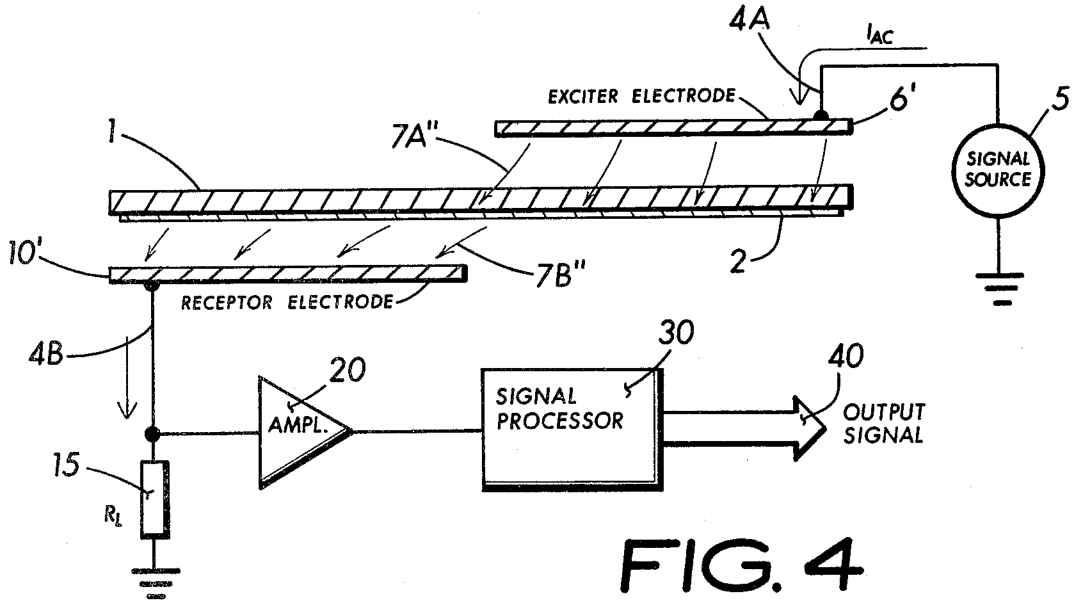
FIG. 4 is a view similar to that of FIG. 3 but illustrating a further modified detecting device according to the invention.

In FIG. 4, detector arrangement is illustrated wherein the excitor electrode 6 produces electric field lines 7A" which act to charge the conductive indicia 2 through the dielectric substrate 1. In contrast, the resultingly induced indicia field lines 7B" are brought to bear directly on the receptor electrode 10. The a.c. current flow $I_{AC}$ produces a current flow 4A, which flows by way of the exciter electrode through the dielectric 1, reaching the indicia 2 and exiting by way of the space dielectric to produce an output current flow 4B through load resistor 15 whereby to produce a signal which may be amplified by amplifier 20. The output of amplifier 20 is coupled to the signal processor 30, and results in an output 40.

Figure 5:
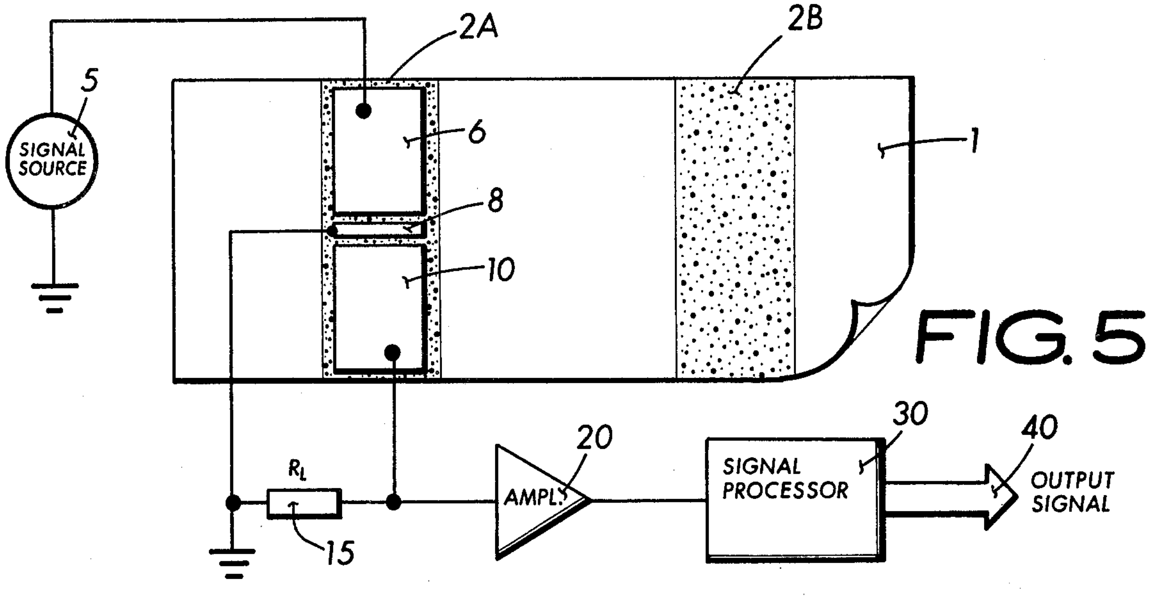
FIG. 5 is a diagrammatic plan view representing the device illustrated in FIGS. 1 and 2.

A single station sensor arrangement is illustrated in FIG. 5. Here excitor electrode 6 and receptor electrode 10 are arranged over indicia stripe 2A on a document substrate 1. A signal is developed across the load resistor 15 which may be utilized in a meaningful way. A guard electrode 8 is shown, which, being of much smaller area relative to the indicia than either other electrode function 6, 10, acts principally to inhibit electric field line extensions between the otherwise adjacent edges of the excitor electrode 6 and receptor electrode 10.

Figure 6:
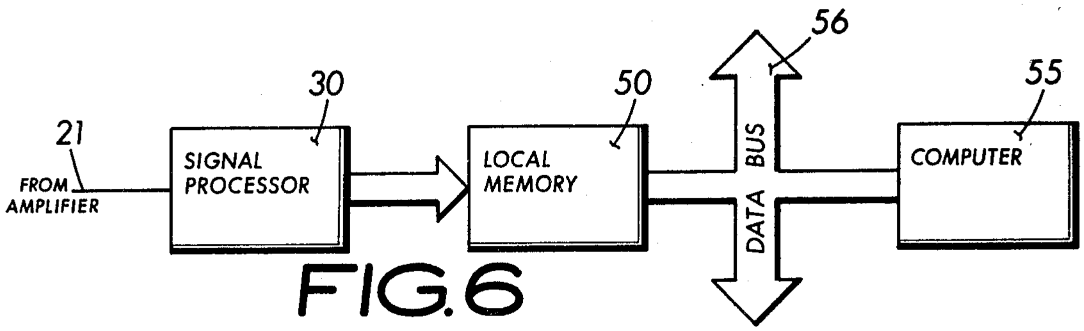
FIG. 6 is a diagrammatic representation illustrating means provided by the invention to employ the recognition signal obtained from the sensing device pursuant to examination of the document.
Figure 7:
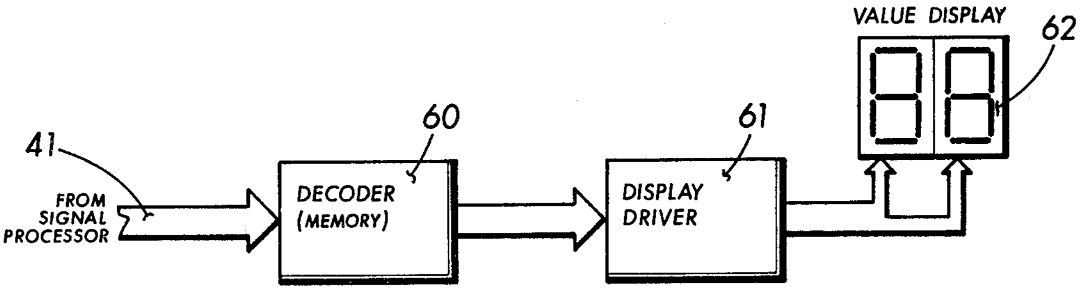
FIG. 7 is a diagrammatic representation similar to that of FIG. 6 but illustrating other means for employing the recognition signal.

Referring to FIG. 6, the output 21 of the amplifier 20 in the prior figures is coupled to signal processor 30 where it is processed by combinatorial logic so as to produce a recognition signal which is coupled to a local memory 50 (such as an addressable latch or the like) which includes a typical tri-state output configuration and serves as a data bus interface which may have buffer storage which in turn, may be coupled to an operational computer 55, as well as to an ancillary data bus 56. This enables the recognition signal to effect operation of a machine such as for purposes of document sorting, record keeping, or the like functional operations.

When coupled with a station such as depicted in FIG. 1, the computer instruction further may be able to "read" the indicia, even if inserted in an inverted position. Furthermore, the computer may receive data bus signals 56 which can be compared with the signal processor signals 40. Such signals 56 might originate from optical character recognition systems which optically scan the document, or even from keyboard entry for value introduced by an operator visually inspecting the document.

The arrangement of the indicia, when employed in an input station such as described in FIG. 1, produces a unique binary pattern code which may correspond with the document value. For example, if the document 1 of FIG. 1 is a genuine twenty-dollar bank note, the indicia would be correspondingly patterned. When read out by the several receptor electrodes 10A to 10E the result is a binary signal pattern, e.g. a binary byte, which serves to couple the output from the signal processor to a decoder 60 which may be a preprogrammed memory. The decoder 60 serves to effect a value display 62. In this example, the display 62 would show the numeral digits "20", as electrically instructed by the display driver 61.

Figure 8:
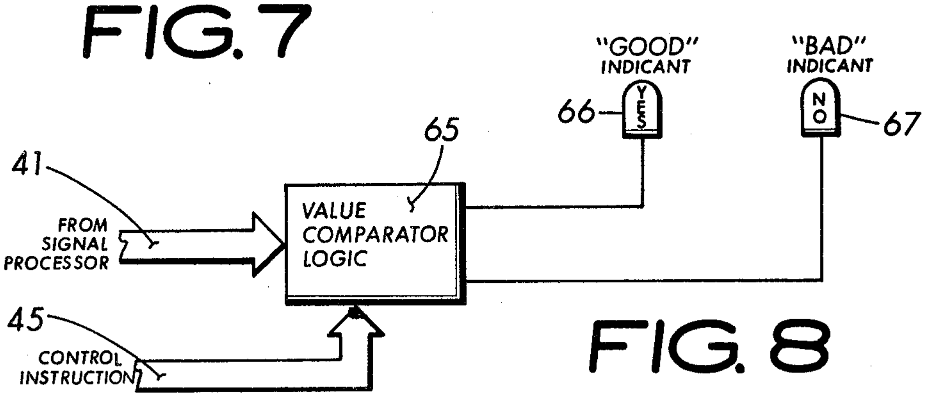
FIG. 8 is a diagrammatic representation similar to those of FIGS. 6 and 7 but illustrating further employment of the recognition signal.

The resultant display giving merely a "GOOD" or "BAD" representation, is represented by references 66, 67 in FIG. 8. As before, the indicia weight, which corresponds with the document intrinsic value, produces an electrical signal binary byte which couples to a value comparator logic function 65. This function is a memory-type function combined with a comparative logic network which is able to produce a first output when the indicia is "correct", hence, the "GOOD" indication 66. In contrast, correspondence with an indicia mismatch or fault, produces a second output which controls the "BAD" indicator 67. The particular recognition condition set up for the value comparator logic 65 is introduced by a control instruction signal 45, the latter effected by operation of a keyboard entry by an operator after visually viewing the documents' apparent visual value, or from a preprogrammed memory which may cause the machine to respond only to certain prescribed denominational values.

Figure 9:
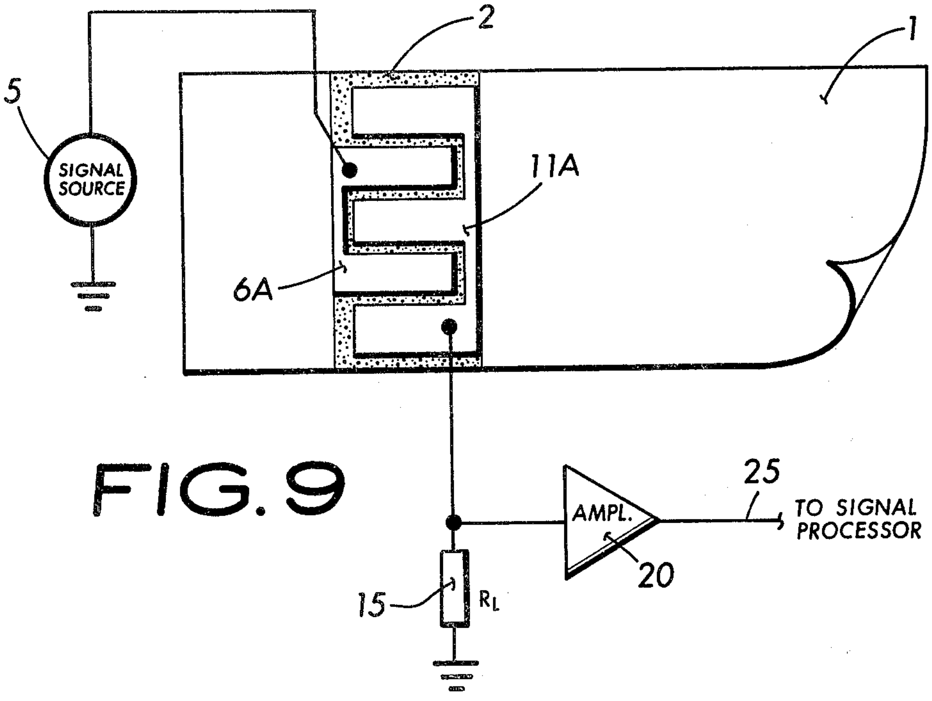
FIG. 9 is a diagrammatic representation of a modified embodiment of the invention intended to obviate any stray capacitive signals encountered.

The excitor electrode 6 and the receptor electrode 11 may be modified in configuration, say as shown in FIG. 9 for the purpose of precluding output signal loss 25 from the amplifier 20 due to defective or otherwise less efficient indicia 2. The condition of one or more of the detectable indicia 2 may vary widely throughout its useful life due to wear and other factors. The result is an indicia which may in part be discontinuous, or "blotchy," which can result in a weak signal from the sensor arrangement such as that depicted in FIG. 5. Thus the excitor electrode is of interlocking "C" shaped configuration interleaved with "E" shaped receptor electrode 11A to produce a greater electrode field overcovering of the indicia surface. Therefore, the apparent uniformity of the indicia, where the intrinsic uniformity is spoiled by indicia flaws, will be enhanced.

It must be understood that any electrode configuration providing the necessary field interlocking satisfies the purpose of this response enhancement. Furthermore, the addition of a guard electrode element between the two distinct sensor electrode elements is well within the teaching concept of the invention and serves as an enhancement of performance otherwise degraded by parasitic effects.

Figure 10:
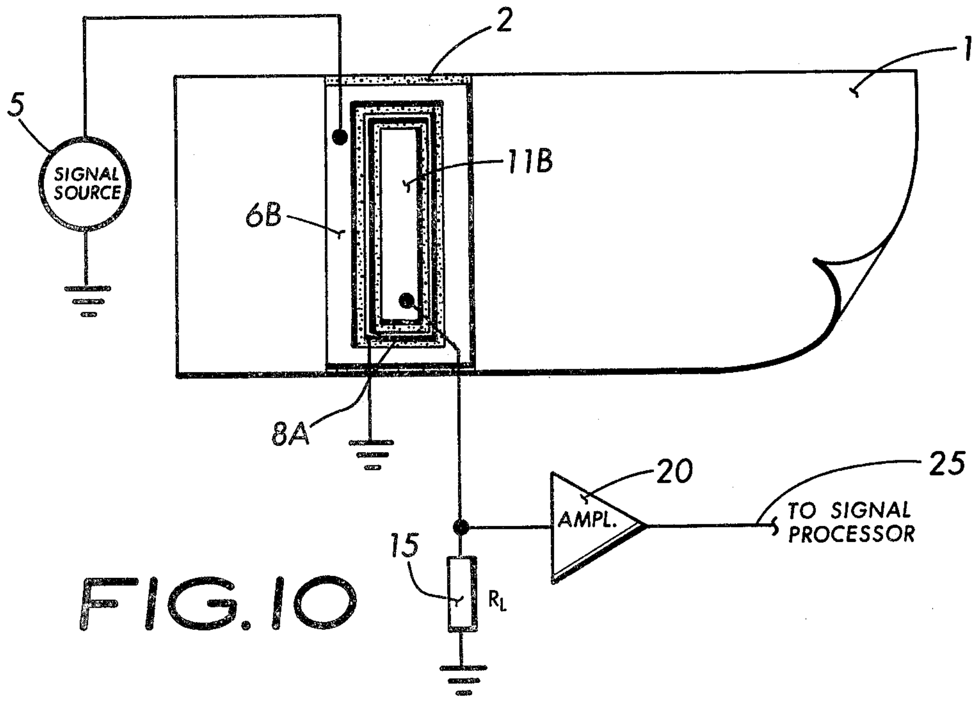
FIG. 10 is a diagrammatic representation representing a further modified embodiment of the invention.
Figure 11:
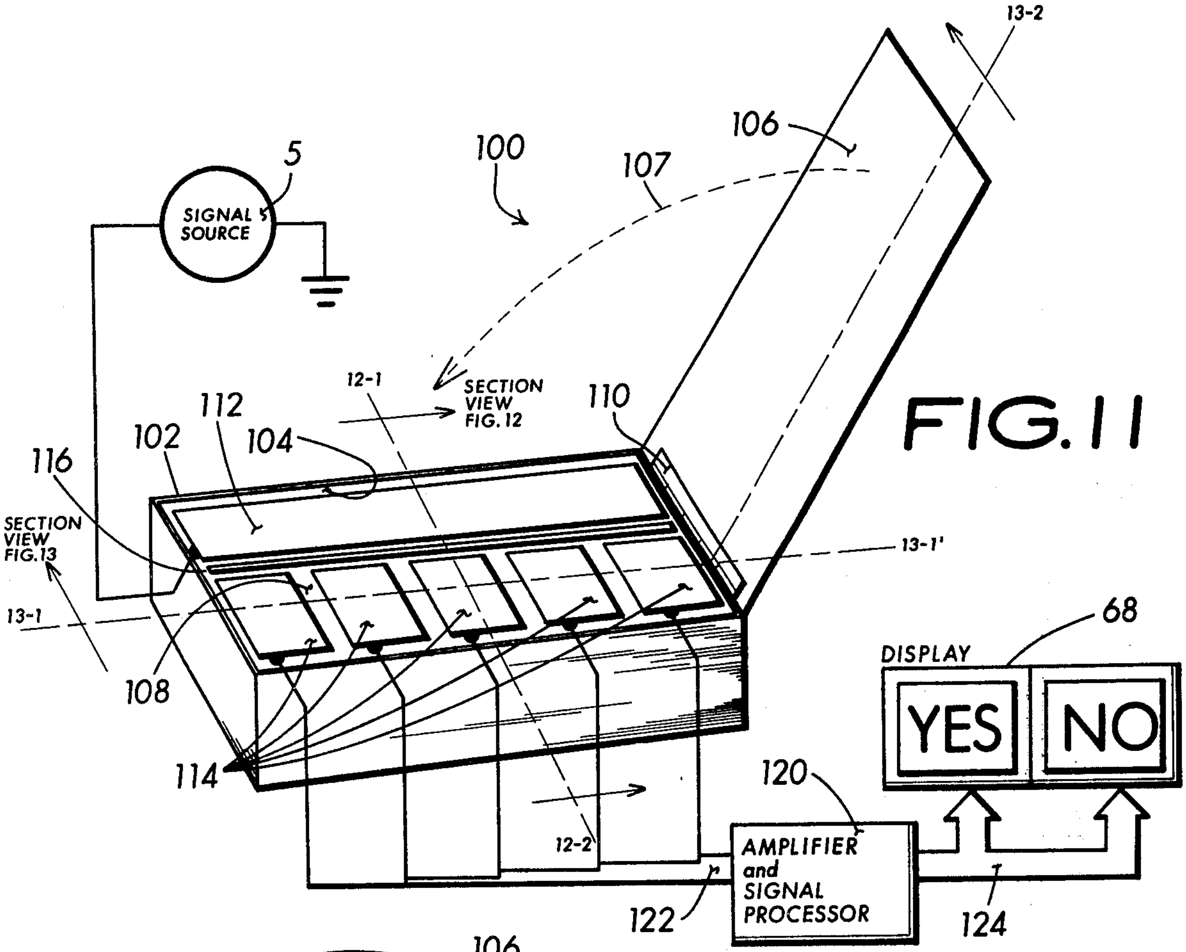
FIG. 11 is a perspective view of a portable sensing and/or recognition device embodying the invention.

The modified electrode configuration illustrated in FIG. 10 is particularly suitable for printed circuit layout and serves to overcome indicia field non-uniformities. With the excitor electrode 6B substantially surrounding the indicia, there is a maximum induced indicia signal which may translate to the receptor electrode 11B which extends a substantial part of the full width of the document 1 and indicia 2.

The receptor electrode serves to pick up a signal which is only instantly brought about by the primary effect of the excitor electrode electric field line extensions. Therefore, the effect does not depend upon the retention of an energy element, such as magnetic field retention in magnetic oxide coatings, nor the retention of an electric charge as in the electrostatic field measurement devices. Furthermore, the effect is not negated by a preponderance of residual electric field, e.g. static charge or the like on either the substrate or the indicia. Such a static field will have no effect on the receptor electrode response relative to the unique excitor electrode signal. Furthermore, a document or indicia which may not be able to retain a static charge for any useful time frame, where such retention is essential to the signal recognition, may reasonably be expected to effect a response employing devices of the invention because the necessary charge retention time is minimal, e.g. about 1/1.414 F seconds, (where F=signal source/-frequency).

The document is brought in direct intimate contact with the excitor and receptor electrodes. This close contact allows direct intercourse of the electric field line extensions, with or without the benefit of much intervening dielectric function. Direct contact, e.g. no separation by an air gap or the like corresponds with an apparent dielectric constant of infinity. Therefore, maximum transfer of the excitor electrode energy will be made to the receptor electrode. On the other hand, some air gap, or substrate interleaving, will act as a sheath which will only serve to reduce the degree of coupling between the correspondent electrodes, while still retaining the effective purpose of the system: that to be determinative if a coupling medium, in the form of a conductive indicia, is present or not.

Figure 12:
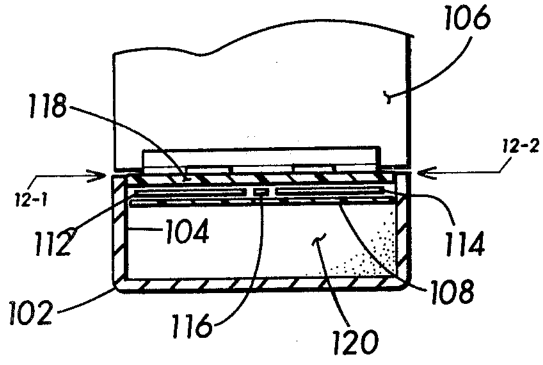
FIG. 12 is an elevational sectional view taken along the lines 12—12 of FIG. 11, shown with the cover open.
Figure 13:
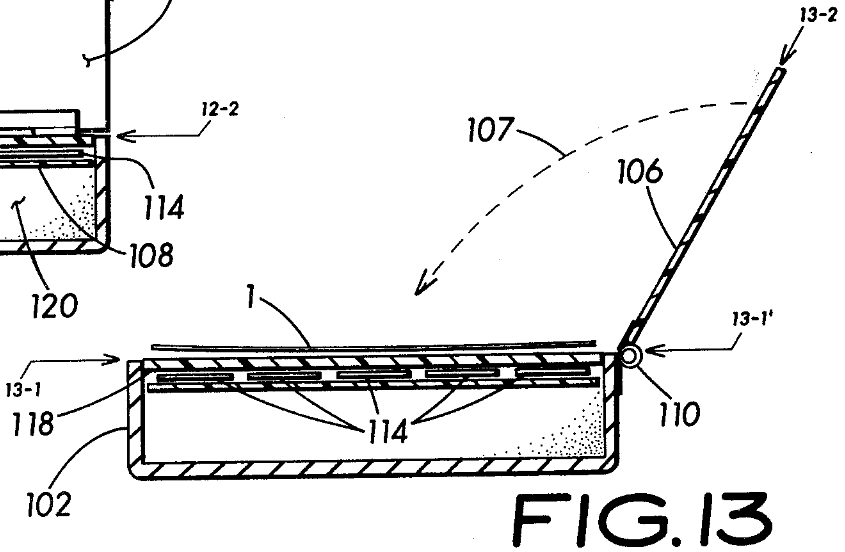
FIG. 13 is a sectional view along lines 13—13 of FIG. 12 but shown with the cover closed and the document arranged therein for inspection.

Referring to FIGS. 12 and 13, there is illustrated a device 100 for the sensing and/or recognition of indicia 2 for the purpose of determining the genuineness and/or value of a security document carrying such indicia.

The device 100 comprises a housing 102 having a transparent cover 106. Upstanding walls 104 define with floor 101, an open-topped enclosure represented by reference character 108. The cover 106 may be hingedly connected to one of the walls 104 as shown at 110. The planar excitor electrode 112 is disposed on the floor 108 along one side of the wall 104. A plurality of receptor electrodes 114 are disposed spaced apart in a row on the floor along the opposite side of wall 104, said side designated 104'. A guard electrode 116 is arranged within the housing on the floor between the excitor electrode and the row of receptor electrodes. A compartment 120 below floor 108 provided for receiving a suitable printed circuit board carrying the suitble circuitry, including amplifying and signal processing. Means are also provided therein to effect the coupling of excitor electrode to a source (exterior) of high frequency a.c. current while lead means are coupled to the circuitry to direct the output of the signal processors to a function performing unit, such as digital display.

An insulating plate 118 may be superposed overlying the electrodes for supporting the document to be tested over said excitor and plural receptor electrodes.

It should be understood that the a.c. signal can be selected of such frequency that the capacitance reactance between the respective electrodes and the indicia is substantially less than the reactance of any parasitic direct coupling between the electrodes. The a.c. excitation is provided by a signal from the source whose intrinsic frequency lays between about 500 cycles and about 100 kilohertz.

Other variations may be operationally feasible within the spirit and scope of the invention as defined in the appended claims.

I claim:

1. Sensing and/or recognition apparatus for determining the genuineness and/or value of a security document having encoding indicia applied to the substrate surface thereof as a thin, transparent coating normally invisible and including particles driven into the surface of said substrate to a substantial depth wherein the particles of indicia material are possessed of an electrical conductivity different from the surrounding portions of the substrate surface, said apparatus comprising a housing, first and second electrode means arranged within said housing and spaced apart to define a gap therebetween, a source of high frequency alternating current coupled to said first and second electrode means for imparting a primary a.c. signal thereacross, means for positioning the document to be tested proximate with and spaced from at least said first electrode means, the encoding indicia being electrically exposed to said first and second electrode means whereby capacitively to induce instantaneously a secondary a.c. signal to said second electrode means providing said encoding indicia is present, said secondary signal being different from said primary signal and means for sensing instantaneously said secondary signal and generating an output signal responsive thereto.

2. The apparatus as claimed in claim 1 wherein said means for sensing said secondary signal includes means for sensing its value.

3. The apparatus as claimed in claim 1 in which said first electrode means comprises a planar conductor arranged along a portion of said housing therewithin.

4. The apparatus as claimed in claim 1 in which said first and second electrode means comprise respectively an excitor electrode arranged within the housing and plural receptor electrodes arranged in a row spaced one from the other and said row being spaced from said excitor electrode, said document to be tested adapted to be placed in bridging relation to said first and second electrodes whereby to bridge same and capacitively to induce said secondary signal to only those ones of said receptor electrodes in aerial proximity to the indicia carried by said document.

5. The apparatus as claimed in claim 4 in which said electrodes are planar in configuration.

6. The apparatus as claimed in claim 4 in which said first and second electrodes are coplanar.

7. The apparatus as claimed in claim 4 and amplifier means having an input and output, said receptor electrodes are each connected to ground and to said input, and signal processing means coupled to said output, said signal processing means having an output functioning as a recognition signal.

8. The apparatus as claimed in claim 7 and interface means coupled to said signal processing means, means for effecting secondary functions and said signal processing means being coupled to said means for effecting secondary functions through said interface means.

9. The apparatus as claimed in claim 8 in which said interface means include a buffer storage function.

10. The apparatus as claimed in claim 8 in which said interface means include a computor oriented data bus.

11. The apparatus as claimed in claim 8 in which there is provided value comparator logic means coupled to said signal processing means for receiving the output thereof, means for effecting instructional control of said logic means and means responsive to said logic means for indicating presence or absence of said indicia.

12. The apparatus as claimed in claim 7 in which said amplifier means functions independently with each said receptor electrode.

13. The apparatus as claimed in claim 7 and decoding means coupled to said signal processing means for receiving the output thereof, said decoding means including a display drive means and display means coupled thereto and responsive to said output for effecting visual display dependent upon said secondary signal.

14. The apparatus as claimed in claim 1 in which said housing includes a transparent cover to enable viewing of the document within the housing from the exterior thereof.

15. The apparatus as claimed in claim 1 in which there is an insulating member arranged superposed over said first and second electrode means and capable of supporting said document thereover.

16. The apparatus as claimed in claim 1 in which said first and second electrode comprise interleaved coplanar electrodes.

17. The apparatus as claimed in claim 16 in which one of said excitor electrode means comprise a C-shaped plate nested within a coplanar E-shaped receptor electrode.

18. The apparatus as claimed in claim 1 and insulating plate means within said housing overlying said first and second electrode means for supporting the document to be tested thereover.

19. The apparatus as claimed in claim 1 wherein said means for sensing are responsive to capacitatively induced a.c. signals produced in the presence of said indicia when the magnitude of said signals exceed a predetermined value and indicating means coupled to said sensing means and operative upon said magnitude exceeding said predetermined value.

20. The apparatus as claimed in claim 1 wherein said means for sensing are responsive to capacitatively induced a.c. signals produced in the presence of said indicia when the magnitude of said signals exceed a predetermined value and indicating means coupled to said sensing means and operative when said magnitude is within a predetermined range of values, said indicating means being operable thereat to produce a positive indication of the presence of said indicia as indicative of the genuineness of said document.

21. The apparatus as claimed in claim 1 wherein the a.c. signal is selected of such frequency that the capacitive reactance between the respective electrodes and the indicia is substantially less than the reactance of any parasitic direct coupling between the electrodes.

22. The apparatus as claimed in claim 1 wherein the a.c. excitation is provided by a signal from the source whose intrinsic frequency lays between about 500 cycles and about 100 kilohertz.

23. Sensing and/or recognition apparatus for determining the genuineness and/or value of a security document having encoding indicia applied to the substrate surface thereof wherein the indicia material is possessed of an electrical conductivity different from the surrounding portions of the substrate surface, said apparatus comprising a housing, first and second electrode means arranged within said housing and spaced apart to define a gap therebetween, said first electrode means comprising a planar conductor arranged along a portion of said housing, a grounded guard electrode intermediate said first and second electrodes, a source of high frequency alternating current coupled to said first and second electrode means for imparting a primary a.c. signal thereacross, means for positioning the document to be tested proximate with and spaced from at least said first electrode means whereby capacitively to induce instantaneously a secondary a.c. signal to said second electrode means providing said encoding indicia is present, said secondary signal being different from said primary signal and means for sensing instantaneously said secondary signal and generating an output signal responsive thereto.

24. Sensing and/or recognition apparatus for determining the genuineness and/or value of a security document having encoding indicia applied to the substrate surface thereof wherein the indicia material is possessed of an electrical conductivity different from the surrounding portions of the substrate surface, said apparatus comprising a housing, first and second electrode means arranged within said housing and spaced apart to define a gap therebetween, said first and second electrode means comprise respectively an excitor electrode arranged within the housing and plural receptor electrodes arranged in a row spaced one from the other and said row being spaced from said excitor electrode, said document to be tested adapted to be placed in bridging relation to said first and second electrodes whereby to bridge same and capacitively to induce said secondary signal to only those ones of said receptor electrodes in serial proximity to the indicia carried by said document, said excitor and receptor electrodes being disposed on opposite sides of said document but the excitor electrode being substantially offset from the receptor electrodes, a source of high frequency alternating current coupled to said first and second electrode means for imparting a primary a.c. signal thereacross, means for positioning the document to be tested proximate with and spaced from at least said first electrode means whereby capacitively to induce instantaneously a secondary a.c. signal to said second electrode means providing said encoding indicia is present, said secondary signal being different from said primary signal and means for sensing instantaneously said secondary signal and generating an output signal responsive thereto.

25. Sensing and/or recognition apparatus for determining the genuineness and/or value of a security document having encoding indicia applied to the substrate surface thereof wherein the indicia material is possessed of an electrical conductivity different from the surrounding portions of the substrate surface, said apparatus comprising a housing, first and second electrode means arranged within said housing and spaced apart to define a gap therebetween, said first and second electrode means comprising interleaved coplanar electrodes nested concentrically, a source of high frequency alternating current coupled to said first and second electrode means for imparting a primary a.c. signal thereacross, means for positioning the document to be tested proximate with and spaced from at least said first electrode means whereby capacitively to induce instantaneously a secondary a.c. signal to said second electrode means providing said encoding indicia is present, said secondary signal being different from said primary signal and means for sensing instantaneously said secondary signal and generating an output signal responsive thereto.

26. The apparatus as claimed in claim 25 in which a guard electrode is located concentrically with said excitor and receptor electrode and between the same, said guard electrode being grounded.

27. The apparatus as claimed in claim 20 in which said cover is transparent.

28. Sensing and or recognition apparatus for determining the genuineness and/or value of a security document having encoding indicia applied to the substrate surface thereof as a thin, transparent coating normally invisible and including particles driven into the surface of said substrate to a substantial depth wherein the particles of indicia material is possessed of an electrical conductivity different from the surrounding portions of the substrate surface, said apparatus comprising a housing, first and second electrode means arranged within said housing and spaced apart to define a gap therebetween, means for imparting a primary signal across said electrodes, said primary signal having a wave form exhibiting a rate of change with an equivalent frequency component which is at least 500 cycles, means for positioning the document to be tested proximate with and spaced from at least said first electrode means, the encoding indicia being electrically exposed to said first and second electrode means whereby capacitively to induce instantaneously a secondary signal by way of said indicia to said second electrode means providing said encoding indicia is present, said secondary signal being different from said primary signal and means for sensing instantaneously said secondary signal and generating an output signal responsive thereto.

29. The apparatus as claimed in claim 28 wherein the equivalent frequency component of the primary signal is selected of a value so that the capacitive reactance between the respective electrodes and the indicia is substantially less than the reactance of any parasitic direct coupling between the electrodes.

* * * * *